United States Patent
Saglani et al.

(10) Patent No.: US 11,436,229 B2
(45) Date of Patent: Sep. 6, 2022

(54) SYSTEM AND METHOD OF UPDATING TEMPORARY BUCKET BASED ON OBJECT ATTRIBUTE RELATIONSHIPS OR METADATA RELATIONSHIPS

(71) Applicant: Nutanix, Inc., San Jose, CA (US)

(72) Inventors: Divya Harish Saglani, Pune (IN); Manik Taneja, Bangalore (IN)

(73) Assignee: Nutanix, Inc., San Jose, CA (US)

( * ) Notice: Subject to any disclaimer, the term of this patent is extended or adjusted under 35 U.S.C. 154(b) by 114 days.

(21) Appl. No.: 16/904,479

(22) Filed: Jun. 17, 2020

(65) Prior Publication Data

US 2021/0334147 A1 Oct. 28, 2021

(30) Foreign Application Priority Data

Apr. 28, 2020 (IN) .............................. 202041018166

(51) Int. Cl.
| | |
|---|---|
| *G06F 9/46* | (2006.01) |
| *G06F 16/2455* | (2019.01) |
| *G06F 16/2457* | (2019.01) |
| *G06F 16/28* | (2019.01) |
| *G06F 16/242* | (2019.01) |
| *G06F 9/455* | (2018.01) |
| *G06F 9/50* | (2006.01) |

(52) U.S. Cl.
CPC .... *G06F 16/24554* (2019.01); *G06F 9/45558* (2013.01); *G06F 9/505* (2013.01); *G06F 9/5016* (2013.01); *G06F 9/5077* (2013.01); *G06F 16/244* (2019.01); *G06F 16/24573* (2019.01); *G06F 16/284* (2019.01); *G06F 2009/45579* (2013.01); *G06F 2009/45583* (2013.01)

(58) Field of Classification Search
CPC ......... G06F 16/24554; G06F 16/24573; G06F 16/284; G06F 16/244; G06F 9/45558; G06F 9/5016; G06F 9/505; G06F 9/5077; G06F 2009/45579; G06F 2009/45583
USPC ........................................................ 718/1, 104
See application file for complete search history.

(56) References Cited

U.S. PATENT DOCUMENTS

| | | |
|---|---|---|
| 6,209,128 B1 | 3/2001 | Gerard et al. |
| 6,775,673 B2 | 8/2004 | Mahalingam et al. |

(Continued)

OTHER PUBLICATIONS

Oracle Multimedia User's Guide, 12c Release 1 (12.1), E17697-09 Jul. 2014 (Year 2014).

(Continued)

*Primary Examiner* — Bradley A Teets
(74) *Attorney, Agent, or Firm* — Foley & Lardner LLP (57) ABSTRACT

An illustrative embodiment disclosed herein is an apparatus including a processor having programmed instructions that identify a temporary bucket linked to one or more objects of a main bucket. The processor has programmed instructions that detect that an object is uploaded to the main bucket. The processor has programmed instructions that determine whether the object has an object attribute satisfying an object attribute relationship. The processor has programmed instructions that, if the programmed instructions determine that the object has the object attribute that satisfies the object attribute relationship, add, to the temporary bucket, a link to the object. The illustrative embodiment can reduce latency associated with queries.

14 Claims, 5 Drawing Sheets

(56) References Cited

U.S. PATENT DOCUMENTS

| | | | |
|---|---|---|---|
| 7,395,279 B2 | 7/2008 | Iyengar et al. | |
| 7,653,668 B1 | 1/2010 | Shelat et al. | |
| 7,685,109 B1* | 3/2010 | Ransil | G06F 11/1446 |
| | | | 707/999.003 |
| 7,721,044 B1 | 5/2010 | Chatterjee et al. | |
| 8,019,732 B2 | 9/2011 | Paterson-Jones et al. | |
| 8,166,128 B1 | 4/2012 | Faulkner et al. | |
| 8,250,033 B1 | 8/2012 | De Souter et al. | |
| 8,312,027 B2 | 11/2012 | Lamb et al. | |
| 8,352,424 B2 | 1/2013 | Zunger et al. | |
| 8,549,518 B1 | 10/2013 | Aron et al. | |
| 8,554,724 B2 | 10/2013 | Zunger | |
| 8,601,473 B1 | 12/2013 | Aron et al. | |
| 8,683,112 B2 | 3/2014 | Drobychev et al. | |
| 8,799,222 B2 | 8/2014 | Marathe et al. | |
| 8,849,759 B2 | 9/2014 | Bestler et al. | |
| 8,850,130 B1 | 9/2014 | Aron et al. | |
| 8,863,124 B1 | 10/2014 | Aron | |
| 8,930,693 B2 | 1/2015 | Holt et al. | |
| 8,997,088 B2 | 3/2015 | Gurikar et al. | |
| 9,003,335 B2 | 4/2015 | Lee et al. | |
| 9,009,106 B1 | 4/2015 | Aron et al. | |
| 9,043,372 B2 | 5/2015 | Makkar et al. | |
| 9,043,567 B1 | 5/2015 | Modukuri et al. | |
| 9,052,942 B1 | 6/2015 | Barber et al. | |
| 9,069,708 B2 | 6/2015 | Gill et al. | |
| 9,069,983 B1 | 6/2015 | Nijjar | |
| 9,110,882 B2 | 8/2015 | Overell et al. | |
| 9,256,498 B1 | 2/2016 | Leibowitz et al. | |
| 9,336,132 B1 | 5/2016 | Aron et al. | |
| 9,350,623 B2 | 5/2016 | Shadi et al. | |
| 9,405,806 B2 | 8/2016 | Lysne et al. | |
| 9,652,265 B1 | 5/2017 | Narayanasamy et al. | |
| 9,705,970 B2 | 7/2017 | Pomerantz et al. | |
| 9,747,287 B1 | 8/2017 | Bhardwaj et al. | |
| 9,772,866 B1 | 9/2017 | Aron et al. | |
| 9,805,054 B2 | 10/2017 | Davis et al. | |
| 10,003,650 B2 | 6/2018 | Shetty et al. | |
| 10,120,902 B2 | 11/2018 | Erdogan et al. | |
| 10,176,225 B2 | 1/2019 | Naidu et al. | |
| 10,296,255 B1 | 5/2019 | Tummala | |
| 10,380,078 B1 | 8/2019 | Kumar et al. | |
| 10,409,837 B1 | 9/2019 | Schmidt et al. | |
| 10,528,262 B1 | 1/2020 | Shmuylovich et al. | |
| 10,565,230 B2 | 2/2020 | Zheng et al. | |
| 10,691,464 B1 | 6/2020 | Drego et al. | |
| 10,725,826 B1 | 7/2020 | Sagar et al. | |
| 10,740,302 B2 | 8/2020 | Slik et al. | |
| 10,747,752 B2 | 8/2020 | Krishnaswamy et al. | |
| 10,802,975 B2 | 10/2020 | Gottin et al. | |
| 11,099,938 B2 | 8/2021 | Desai et al. | |
| 2003/0023587 A1 | 1/2003 | Dennis et al. | |
| 2004/0186826 A1 | 9/2004 | Choi et al. | |
| 2006/0047636 A1 | 3/2006 | Mohania et al. | |
| 2006/0080646 A1 | 4/2006 | Aman | |
| 2010/0042673 A1 | 2/2010 | Dayley | |
| 2011/0082962 A1 | 4/2011 | Horovitz et al. | |
| 2011/0137966 A1 | 6/2011 | Srinivasan et al. | |
| 2011/0213884 A1 | 9/2011 | Ferris et al. | |
| 2012/0096052 A1 | 4/2012 | Tolia et al. | |
| 2012/0096205 A1 | 4/2012 | Velayudhan et al. | |
| 2012/0331065 A1 | 12/2012 | Aho et al. | |
| 2012/0331243 A1 | 12/2012 | Aho et al. | |
| 2013/0054523 A1 | 2/2013 | Anglin et al. | |
| 2013/0198472 A1 | 8/2013 | Fang et al. | |
| 2013/0332608 A1 | 12/2013 | Shiga et al. | |
| 2014/0279838 A1 | 9/2014 | Tsirogiannis et al. | |
| 2014/0379840 A1 | 12/2014 | Dao | |
| 2015/0046600 A1 | 2/2015 | Kim | |
| 2015/0254325 A1 | 9/2015 | Stringham | |
| 2015/0378767 A1 | 12/2015 | Tarasuk-Levin et al. | |
| 2016/0048408 A1 | 2/2016 | Madhu et al. | |
| 2016/0092326 A1 | 3/2016 | Wu et al. | |
| 2016/0117226 A1 | 4/2016 | Hetrick et al. | |
| 2016/0207673 A1 | 7/2016 | Shlonsky et al. | |
| 2016/0275125 A1 | 9/2016 | Drobychev et al. | |
| 2017/0075909 A1 | 3/2017 | Goodson et al. | |
| 2017/0091235 A1 | 3/2017 | Yammine et al. | |
| 2017/0109421 A1 | 4/2017 | Stearn et al. | |
| 2017/0235764 A1 | 8/2017 | Sharpe et al. | |
| 2017/0235818 A1 | 8/2017 | Gorski et al. | |
| 2017/0242746 A1 | 8/2017 | King et al. | |
| 2017/0344575 A1 | 11/2017 | Naylor et al. | |
| 2017/0351450 A1 | 12/2017 | Brandl et al. | |
| 2018/0165161 A1 | 6/2018 | Slater et al. | |
| 2018/0205791 A1* | 7/2018 | Frank | G06F 16/219 |
| 2018/0292999 A1 | 10/2018 | Nadkarni | |
| 2018/0349463 A1 | 12/2018 | Bernhardy et al. | |
| 2019/0004863 A1 | 1/2019 | Mainali et al. | |
| 2019/0050296 A1 | 2/2019 | Luo et al. | |
| 2019/0102256 A1 | 4/2019 | Murphy | |
| 2019/0196885 A1 | 6/2019 | Song et al. | |
| 2019/0213175 A1 | 7/2019 | Kong et al. | |
| 2019/0213179 A1 | 7/2019 | McHugh et al. | |
| 2019/0227713 A1* | 7/2019 | Parthasarathy | G06F 3/0667 |
| 2019/0324874 A1 | 10/2019 | Gill et al. | |
| 2019/0354544 A1 | 11/2019 | Hertz et al. | |
| 2019/0370362 A1 | 12/2019 | Mainali et al. | |
| 2019/0384678 A1* | 12/2019 | Samprathi | G06F 11/1469 |
| 2020/0004570 A1 | 1/2020 | Glade et al. | |
| 2020/0036787 A1 | 1/2020 | Gupta et al. | |
| 2020/0042364 A1 | 2/2020 | Kumar Shimoga Manjunatha et al. | |
| 2020/0104222 A1 | 4/2020 | Ramamoorthi et al. | |
| 2020/0117637 A1 | 4/2020 | Roy et al. | |
| 2020/0195743 A1 | 6/2020 | Jiang et al. | |
| 2020/0201724 A1 | 6/2020 | Saito et al. | |
| 2020/0250044 A1 | 8/2020 | Sharma et al. | |
| 2020/0310859 A1* | 10/2020 | Gupta | G06F 3/0635 |
| 2020/0310980 A1 | 10/2020 | Gupta et al. | |
| 2020/0314174 A1 | 10/2020 | Dailianas et al. | |
| 2020/0319909 A1 | 10/2020 | Jawahar et al. | |
| 2020/0387510 A1 | 12/2020 | Ransil et al. | |
| 2020/0394078 A1* | 12/2020 | Taneja | G06F 9/4806 |
| 2021/0026661 A1 | 1/2021 | Sulcer et al. | |
| 2021/0034350 A1 | 2/2021 | Chen et al. | |
| 2021/0072917 A1 | 3/2021 | Surla et al. | |
| 2021/0124651 A1 | 4/2021 | Srinivasan et al. | |
| 2021/0294499 A1 | 9/2021 | Wang et al. | |

OTHER PUBLICATIONS

Oracle SQL Developer User's Guide, Release 1.5, E12152-08, Jul. 2014 (Year: 2014); pp. 1-128.

Back to Basics_ Writing SQL Queries.

Cano, Ignacio, et al. "Curator: Self-Managing Storage for Enterprise Clusters" (Mar. 27, 2017), from https://www.usenix.org/conference/nsdi17/.

How to use indexing to improve Database Queries.

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Sep. 17, 2019), from https://nutanixbible.com/.

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

The Nutanix Bible; from https://nutanixbible.com/; accessed on Jan. 12, 2016.

The Nutanix Bible; from https://nutanixbible.com/; accessed on Jun. 25, 2018.

(56) References Cited

OTHER PUBLICATIONS

The Nutanix Bible; from https://nutanixbible.com/; accessed on Jan. 3, 2017.
The Nutanix Bible; from https://nutanixbible.com/; accessed on Jan. 3, 2018.
The Nutanix Bible; from https://nutanixbible.com/; accessed on Sep. 4, 2015.
The Nutanix Bible; from https://nutanixbible.com/; accessed on Jan. 8, 2019.
The Nutanix Bible; from https://nutanixbible.com/; accessed on Jun. 8, 2017.
The Nutanix Bible; from https://nutanixbible.com/; accessed on Jun. 9, 2016.
"Adding Objects to Versioning—Enabled Buckets", from https://docs.aws.amazon.com/AmazonS3/latest/dev/AddingObjectstoVersioningEnabledBuckets.html, (Oct. 2, 2019).
"Adding objects to versioning-enabled buckets—Amazon Simple Storage Service.pdf," https://docs.aws.amazon.com/AmazonS3/latest/userguide/AddingObjectstoVersioningEnabledBuckets.html, pp. 1-2.
"AWS Pricing"; Amazon Web Services; https://aws.amazon.com/pricing/; Webpage accessed on Jun. 23, 2021; pp. 1-9.
"Cloud & Hosting Services—Building a Cloud Infrastructure"; NetApp; https://www.netapp.com/hybrid-cloud/service-provider-infrastructure/; webpage accessed on Jun. 23, 2021; pp. 1-11.
"Configure a Pod to Use a ConfigMap", from https://kubernetes.io/docs/tasks/configure-pod-container/configure-pod-configmap/,(Oct. 2, 2019).
"Creating an NFS file share"; AWS Storage Gateway—User Guide; https://docs.aws.amazon.com/storagegateway/latest/userguide/CreatingAnNFSFileShare.html; webpage accessed on Oct. 28, 2020; pp. 1-10.
"Deployments", from https://kubernetes.io/docs/concepts/workloads/controllers/deployment/,(Oct. 2, 2019).
"IT Service Provider Tecnnology Solutions and Services"; HPE—Hewlett Packard; https://www.hpe.com/us/en/solutions/service-providers.html?parentPage=/us/en/solutions/service-providers; Webpage accessed on Jun. 23, 2021; pp. 1-6.
"Managed VMware Cloud Services"; VMware; https://cloud.vmware.com/providers/managed-services-provider; Webpage accessed on Jun. 23, 2021; pp. 1-5.
"Managing your storage lifecycle"; Amazon Simple Storage Service; https://docs.aws.amazon.com/AmazonS3/latest/userguide/object-lifecycle-mgmt.html; webpage accessed on Jun. 18, 2021; pp. 1-2.
"Method:disks.get|Compute Engine Documentation|GoogleCloud.pdf," https://cloud.google.com/compute/docs/reference/rest/v1/disks/get, pp. 1-17.
"NetApp ONTAP 9.7 Announced—StorageReview.com," (Jun. 14, 2019), https://www.peakresources.com/netapp-ontap-9-6-release-notes-and-thoughts/, pp. 1-5.
"Nutanix Solution for Service Providers"; Nutanix, Inc. Solution Brief; https://aemstage.nutanix.cn/viewer?type=pdf&path=/content/dam/nutanix/resources/solution-briefs/sb-service-provider-solution-brief.pdf&icid=67VMYKPR6K60; 2020; pp. 1-3.
"Per Virtual Machine Licensing"; VMware PerVM Pricing & Licensing Help; https://www.vmware.com/support/support-resources/licensing/per-vm.html; Webpage accessed on Jun. 23, 2021; pp. 1-7.
"PUT Object|Cloud Storage|Google Cloud," https://cloud.google.com/storage/docs/xml-api/put-object, pp. 1-3.
"Retrieving object versions from a versioning-enabled bucket—Amazon Simple Storage Service.pdf," https://docs.aws.amazon.com/AmazonS3/latest/userguide/RetrievingObjectVersions.html, pp. 1-3.
"Retrieving Object Versions", from https://docs.aws.amazon.com/AmazonS3/latest/dev/RetrievingObjectVersions.html, (Oct. 2, 2019).
"Set up Cluster Federation with Kubefed—Kubernetes", from https://v1-14.docs.kubernetes.io/docs/tasks/federation/set-up-cluster-federation-kubefed/, (Apr. 17, 2020).
"Storage Tiering"; VMware Docs; https://docs.vmware.com/en/VMware-Validated-Design/5.0/com.vmware.vvd.sddc-design.doc/GUID-20D2BC02-4500-462F-A353-F9B613CC07AC.html; webpage accessed on Jun. 18, 2021; pp. 1-3.
"SwiftOnFile"; Object Storage-Gluster Docs; v: releases.7.0beta1; https://staged-gluster-docs.readthedocs.io/en/release3.7.0beta1/Administrator%20Guide/Object%20Storage/; webpage accessed on Oct. 28, 2020; pp. 1-2.
"Transitioning objects using Amazon S3 Lifecycle"; Amazon Simple Storage Service; https://docs.aws.amazon.com/AmazonS3/latest/userguide/lifecycle-transition-general-considerations.html; Webpage was accessed on Jun. 18, 2021; pp. 1-5.
"Using Amazon S3 storage classes"; Amazon Simple Storage Service; https://docs.aws.amazon.com/AmazonS3/latest/userguide/storage-class-intro.html; Webpage accessed on Jun. 16, 2021; pp. 1-6.
"Volumes", from https://kubernetes.io/docs/concepts/storage/volumes/, (Oct. 2, 2019).
"Xml and More: OCI?Knowing Object Storage Basics" (Jan. 13, 2019), http://xmlandmore.blogspot.com/2019/01/ociknowing-object-storage-basics.html, pp. 1-6.
Amazon Simple Storage Service User Guide API Version Mar. 1, 2006 (Year: 2006).
B Tree Indexes. http://web.csulb.edu/-amonge/classes/common/db/B TreeIndexes.html, Aug. 4, 2018, pp. 1-7 (2018).
Dellemc, "Elastic Cloud Storage (ECS)," (Aug. 2017), https://repository.usc.edu/sites/repository.usc.edu/files/ecs_overview.pdf. pp. 1-57.
Dubinsky Leon, "Behind the scenes of Cloud Spanner's ExecuteQuery request|Google Cloud Blog," (Jan. 7, 2021), https://cloud.google.com/blog/topics/developers-practitioners/behind-the-scenes-of-cloud-spanners-executequery-request, pp. 1-7.
F5, "Enable Single Namespace for VMware Horizon with View Deployments," https://www.f5.com/pdf/solution-center/vmware-single-namespace-overview.pdf, pp. 1-2.
FireEye, "Building Scalable and Responsive Big Data Interfaces with AWS Lambda | AWS Big Data Blog," (Jul. 10, 2015), https://aws.amazon.com/blogs/big-data/building-scalable-and-responsive-big-data-interfaces-with-aws-lambda/, pp. 1-10.
Gowri Balasubramanian; "Should Your DynamoDB Table Be Normalized or Denormalized?"; AWS Database Blog; https://aws.amazon.com/blogs/database/should-your-dynamodb-table-be-normalized-or-denormalized/; Dec. 5, 2016; pp. 1-5.
Guess A.R., "Cloudian HyperStore 7 Multi-Cloud Data Management Unifies Public Cloud and On-Premises Storage—Dataversity," (Jan. 29, 2018), https://www.dataversity.net/cloudian-hyperstore-7-multi-cloud-data-management-unifies-public-cloud-premises-storage/, pp. 1-4.
Luis Ayuso; "How to Report Monthly Usage with the Flex Pricing Model"; VMware Cloud Provider Blog; May 20, 2019; pp. 1-6.
Luis Ayuso; "How to Sign Up for the new VCPP Flex Pricing Model"; VMware Cloud Provider Blog; May 20, 2019; pp. 1-6.
Luis Ayuso; "New VCPP Pricing Model Simplifies Delivering Services"; VMware Cloud Provider Blog; May 20, 2019; pp. 1-6.
Michael Bose; "A Guide on Howto Mount Amazon S3 as a Drive for Cloud File Sharing"; Nakivo Blog-Cloud-Backup to Cloud; https://www.nakivo.com/blog/mount-amazon-s3-as-a-drive-how-to-guide/; Published Jun. 17, 2020; pp. 1-27.
Mike Deck; "Building and Maintaining an Amazon S3 Metadata Index without Servers"; AWS Big Data Blog; https://aws.amazon.com/blogs/big-data/building-and-maintaining-an-amazon-s3-metadata-index-without-servers/; Aug. 12, 2015; pp. 1-6.
NetApp, "A United Platform for Cloud Storage Infrastructure," (Oct. 26, 2020), https://cloud.netapp.com/blog/cvo-blg-one-unified-platform-for-cloud-storage-infrastructure-and-data-services, pp. 1-8.
NetApp, "StorageGRID Solves Your Unstructured Data Management Problems|NetApp Blog," (Apr. 17, 2019), https://www.netapp.com/blog/storagegrid-solves-your-unstructured-data-management-problems/, pp. 1-6.
Patel Kiran, Goynes Eddie, "Lower latency with AWS Elemental MediaStore chunked object transfer|AWS Media Blog," (Jul. 2, 2019), https://aws.amazon.com/blogs/media/lower-latency-with-aws-elemental-mediastore-chunked-object-transfer/, pp. 1-6.
Rupprecht Lukas, Zhangz Rui, Owen Bill, Pietzuch Peter, Hildebrandz Dean, "SwiftAnalytics: Optimizing Object Storage for Big Data Analytics," https://lsds.doc.ic.ac.uk/sites/default/files/swift-analytics_ic2e17_crv.pdf, pp. 1-7.

(56) References Cited

OTHER PUBLICATIONS

Sonobuoy, "Sonobuoy," https://sonobuoy.io/, 1-6 pages.
Stopford. Log Structured Merge Trees. http://www.benstopford.com/ 2015/02/14/ log-structured-merge-trees, 2015, pp. 1-8 (2015).
VM ware, "VMware Cloud Director Object Storage Extension Documentation.pdf," https://docs.vmware.com/en/VMware-Cloud-Director-Object-Storage-Extension/index.html, pp. 1-3.
VMware, "Introducing HCX Enterprise—Cloud Blog—VMware," (Aug. 8, 2019), https://blogs.vmware.com/cloud/2019/08/08/introducing-hcx-enterprise/, pp. 1-6.
VMware, "VMware HCX Enterprise: Non-vSphere to vSphere Workload Migration—Cloud Blog—VMware," (Aug. 8, 2019), https://blogs.vmware.com/cloud/2019/08/08/vmware-hcx-enterprise-non-vsphere-vsphere-workload-migration/, pp. 1-7.
VMware, "VMware Object Storage Interoperability Service-Development Guide," (Sep. 2021), https://www.vmware.com/content/dam/digitalmarketing/vmware/en/pdf/docs/vmware-object-storage-interoperability-service-development-guide.pdf, pp. 1-19.
Wambler, Choosing a Primary Key: Natural or Surrogate? http://www.agiledata.org/essays/keys.html, 2018, pp. 1-4 (2018).
Wikipedia, "Chunked transfer encoding," https://en.wikipedia.org/wiki/Chunked_transfer_encoding, pp. 1-4/.
Woodward Liz, "What Is Elastic Cloud Storage—A Guide to ECS in 2022," https://www.cloudwards.net/what-is-elastic-cloud-storage/, pp. 1-8.
Final Office Action on No. U.S. Appl. No. 16/526,894 dated Mar. 25, 2022.
Foreign Search Report on EP Application No. 21210465.7 dated Apr. 14, 2022.
Non-Final Office Action on U.S. Appl. No. 16/904,502 dated May 4, 2022.
Notice of Allowance on U.S. Appl. No. 16/904,479 dated May 9, 2022.
Notice of Allowance on U.S. Appl. No. 16/943,977 dated Apr. 18, 2022.
U.S. Office Action on U.S. Appl. No. 16/863,673 dated Apr. 14, 2022.

* cited by examiner

SYSTEM AND METHOD OF UPDATING TEMPORARY BUCKET BASED ON OBJECT ATTRIBUTE RELATIONSHIPS OR METADATA RELATIONSHIPS

CROSS-REFERENCE TO RELATED APPLICATION

This application is related to and claims priority under 35 U.S. § 119(e) from Indian Provisional Application No. 202041018166, filed Apr. 28, 2020, titled "SYSTEM AND METHOD OF QUERYING OBJECTS ON DEMAND," the entire contents of which are incorporated herein by reference for all purposes.

BACKGROUND

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, the present-day virtual computing systems have limitations due to their configuration and the way they operate.

SUMMARY

Aspects of the present disclosure relate generally to a virtualization environment, and more particularly to a system and method for querying objects on demand.

An illustrative embodiment disclosed herein is an apparatus including a processor having programmed instructions that identify a temporary bucket linked to one or more objects of a main bucket, detect that an object is uploaded to the main bucket, determine whether the object has an object attribute satisfying an object attribute relationship, and responsive to determining that the object has the object attribute that satisfies the object attribute relationship, add, to the temporary bucket, a link to the object.

Another illustrative embodiment disclosed herein is A non-transitory computer readable storage medium having instructions stored thereon that, upon execution by a processor, causes the processor to perform operations including identifying a temporary bucket linked to one or more objects of a main bucket, detecting that an object is uploaded to the main bucket, determining whether the object has an object attribute satisfying an object attribute relationship, and responsive to determining that the object has the object attribute that satisfies the object attribute relationship, adding, to the temporary bucket, a link to the object.

Another illustrative embodiment disclosed herein is A computer-implemented method including identifying, by a processor, a temporary bucket linked to one or more objects of a main bucket, detecting, by the processor, that an object is uploaded to the main bucket, determining, by the processor, whether the object has an object attribute satisfying an object attribute relationship, and responsive to determining that the object has the object attribute that satisfies the object attribute relationship, adding, by the processor and to the temporary bucket, a link to the object.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Object storage is the fastest growing form of distributed storage. Object stores are distributed key-value stores that are used to store massive amounts of unstructured data. Object storage provides simplified data-access APIs to GET/PUT objects within a bucket. However, storage admins have little insight into the data being stored in an object storage. Thus, existing APIs have proved incapable in enabling deep storage analytics.

Companies and customers have had to resort to building custom solutions that are unwieldy and expensive. Some existing solutions allow a customer to run an SQL query, but it can only run against a single object. This limits its usefulness to only specific use-cases.

Some embodiments of the disclosure herein, provides a unified SQL (structured query language) embedded within an object store deployment that extends this API to enable queries not just on a single object, but also on all the objects that are contained within a bucket, as well as on the metadata of the objects. The metadata can store information such as who created the object, when was it created, what is the size of the object, what is the content type. Moreover, some implementations of the disclosure herein allow object attribute-based or metadata-based temporary buckets/indices to be created on demand. Leveraging object attribute-based or metadata-based indices can result in reduced latency associated with serving queries on, for example, historical datasets, such as in online analytical processing workloads. Further, some embodiments of the disclosure herein update the object attribute-based or metadata-based indices, which can be useful for workloads that have dynamic data, such as online transaction processing workloads.

Some aspects disclosed herein bring the power of no-SQL databases directly to traditional object stores. Some embodiments are tightly coupled solutions that can scale horizontally by sharding object data and/or deploying additional storage nodes. Some embodiments expand the use and scope of object storage solutions to many data processing applications that can now directly query the object store deployment without resorting to custom and expensive solutions. Some aspects simplify information technology (IT) administration. Not only would an object store deployment be capable of storing large amounts of data, it becomes capable of providing SQL query functionality that is a hallmark of typical database system. This may pave the way for an object store deployment to be one-stop storage solution, thereby freeing a customer from resorting to custom, third party solutions which would result in huge amount of savings in terms of cost and IT resources.

Object Virtualization Technology and Environment

Figure 1:
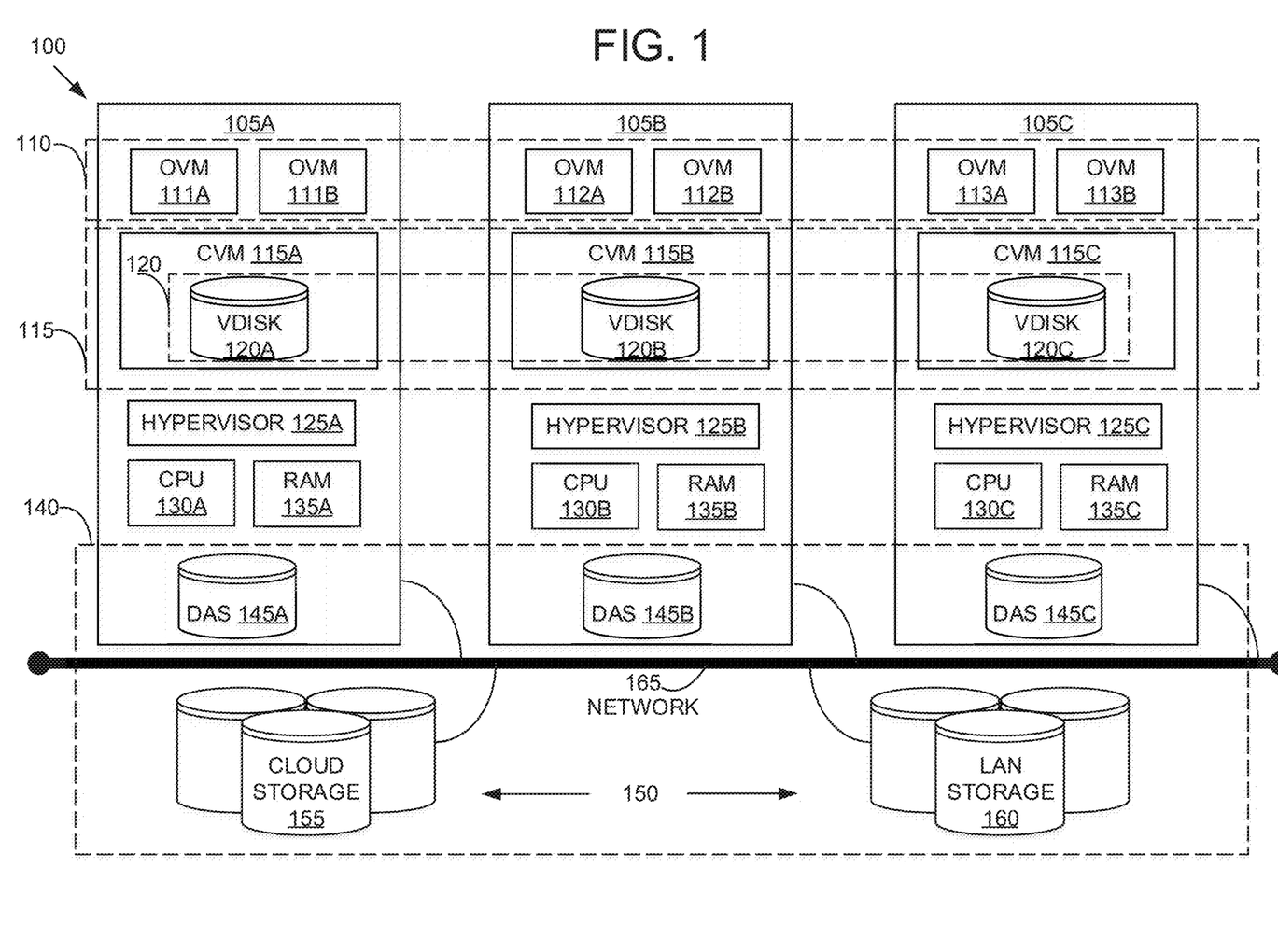
FIG. 1 is an example block diagram of a virtual computing system, in accordance with some embodiments of the present disclosure.

Referring now to FIG. 1, a virtual computing system 100 is shown, in accordance with some embodiments of the present disclosure. The virtual computing system 100 includes a plurality of nodes, such as a first node 105A, a second node 105B, and a third node 105C. The nodes may be collectively referred to herein as "nodes 105." Each of the nodes 105 may also be referred to as a "host" or "host machine." The first node 105A includes an object virtual machine ("OVMs") 111A and 111B (collectively referred to herein as "OVMs 111"), a controller virtual machine ("CVM") 115A, and a hypervisor 125A. Similarly, the second node 105B includes OVMs 112A and 112B (collectively referred to herein as "OVMs 112"), a CVM 115B, and a hypervisor 125B, and the third node 105C includes OVMs 113A and 113B (collectively referred to herein as "OVMs 113"), a CVM 115C, and a hypervisor 125C. The OVMs 111, 112, and 113 may be collectively referred to herein as "OVMs 110." The CVMs 115A, 115B, and 115C may be collectively referred to herein as "CVMs 115." The nodes 105 are connected to a network 165.

The virtual computing system 100 also includes a storage pool 140. The storage pool 140 may include network-attached storage (NAS) 150 and direct-attached storage (DAS) 145A, 145B, and 145C (collectively referred to herein as DAS 145). The NAS 150 is accessible via the network 165 and, in some embodiments, may include cloud storage 155, as well as local area network ("LAN") storage 160. In contrast to the NAS 150, which is accessible via the network 165, each of the DAS 145A, the DAS 145B, and the DAS 145C includes storage components that are provided internally within the first node 105A, the second node 105B, and the third node 105C, respectively, such that each of the first, second, and third nodes may access its respective DAS without having to access the network 165.

The CVM 115A may include one or more virtual disks ("vdisks") 120A, the CVM 115B may include one or more vdisks 120B, and the CVM 115C may include one or more vdisks 120C. The vdisks 120A, the vdisks 120B, and the vdisks 120C are collectively referred to herein as "vdisks 120." The vdisks 120 may be a logical representation of storage space allocated from the storage pool 140. Each of the vdisks 120 may be located in a memory of a respective one of the CVMs 115. The memory of each of the CVMs 115 may be a virtualized instance of underlying hardware, such as the RAMs 135 and/or the storage pool 140. The virtualization of the underlying hardware is described below.

In some embodiments, the CVMs 115 may be configured to run a distributed operating system in that each of the CVMs 115 run a subset of the distributed operating system. In some such embodiments, the CVMs 115 form one or more Nutanix Operating System ("NOS") cluster. In some embodiments, the one or more NOS clusters include greater than or fewer than the CVMs 115. In some embodiments, each of the CVMs 115 run a separate, independent instance of an operating system. In some embodiments, the one or more NOS clusters may be referred to as a storage layer.

In some embodiments, the OVMs 110 form an OVM cluster. OVMs of an OVM cluster may be configured to share resources with each other. The OVMs in the OVM cluster may be configured to access storage from the NOS cluster using one or more of the vdisks 120 as a storage unit. In some embodiments, the OVM cluster include greater than or fewer than the OVMs 110.

Some or all of the OVMs 110 in the OVM cluster may be configured to run software-defined object storage service, such as Nutanix Buckets™. As part of the object storage service (OSS), the OVMs 110 may be configured to deploy (e.g., create) a collection of buckets. A bucket is a virtual representation of, and is created on (e.g., on top of), a virtual disk (e.g., the virtual disk 120A in FIG. 1), or other data store. A bucket is like a folder except that a bucket has a hierarchy flat, whereas a folder has recursion (e.g., sub-folders). The OVMs 110 store/add one or more objects in/to one or more of the buckets (by storing the one or more objects in one or more virtual disks 120 backing the one or more buckets), and manage the buckets and objects. An object can be anything: a file, a document, a spreadsheet, a video, a data, metadata, etc. When buckets are created, they are assigned (e.g., given) endpoints through which the OVMs 110, external users or applications interfacing with the OVMs 110, can access them. Examples of endpoints are uniform resource locators (URLs). After a bucket is created, objects can be added.

Multiple OVM clusters and/or multiple NOS clusters may exist within a given virtual computing system (e.g., the virtual computing system 100). The one or more OVM clusters may be referred to as a client layer or object layer. The OVM clusters may be configured to access storage from multiple NOS clusters. Each of the OVM clusters may be configured to access storage from a same NOS cluster. A central management system, such as Prism Central, may manage a configuration of the multiple OVM clusters and/or multiple NOS clusters. The configuration may include a list of OVM clusters, a mapping of each OVM cluster to a list of NOS clusters from which the OVM cluster may access storage, and/or a mapping of each OVM cluster to a list of vdisks that the OVM cluster owns or has access to.

Each of the OVMs 110 and the CVMs 115 is a software-based implementation of a computing machine in the virtual computing system 100. The OVMs 110 and the CVMs 115 emulate the functionality of a physical computer. Specifically, the hardware resources, such as CPU, memory, storage, etc., of a single physical server computer (e.g., the first node 105A, the second node 105B, or the third node 105C) are virtualized or transformed by the respective hypervisor (e.g. the hypervisor 125A, the hypervisor 125B, and the hypervisor 125C), into the underlying support for each of the OVMs 110 and the CVMs 115 that may run its own operating system, a distributed operating system, and/or applications on the underlying physical resources just like a real computer. By encapsulating an entire machine, including CPU, memory, operating system, storage devices, and network devices, the OVMs 110 and the CVMs 115 are compatible with most standard operating systems (e.g. Windows, Linux, etc.), applications, and device drivers. Thus, each of the hypervisors 125 is a virtual machine monitor that allows the single physical server computer to run multiple instances of the OVMs 110 (e.g. the OVM 111) and at least one instance of a CVM 115 (e.g. the CVM 115A), with each of the OVM instances and the CVM instance sharing the resources of that one physical server computer, potentially across multiple environments. By running the multiple instances of the OVMs 110 on a node of the nodes 105, multiple workloads and multiple operating systems may be run on the single piece of underlying hardware computer to increase resource utilization and manage workflow.

The hypervisors 125 of the respective nodes 105 may be configured to run virtualization software, such as, ESXi from VMWare, AHV from Nutanix, Inc., XenServer from Citrix Systems, Inc., etc. The virtualization software on the hypervisors 125 may be configured for managing the interactions between the respective OVMs 110 (and/or the CVMs 115) and the underlying hardware of the respective nodes 105. Each of the CVMs 115 and the hypervisors 125 may be configured as suitable for use within the virtual computing system 100.

In some embodiments, each of the nodes 105 may be a hardware device, such as a server. For example, in some embodiments, one or more of the nodes 105 may be an NX-1000 server, NX-3000 server, NX-5000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the nodes 105 may be another type of hardware device, such as a personal computer, an input/output or peripheral unit such as a printer, or any type of device that is suitable for use as a node within the virtual computing system 100. In some embodiments, the virtual computing system 100 may be part of a data center.

The first node 105A may include one or more central processing units ("CPUs") 130A, the second node 105B may include one or more CPUs 130B, and the third node 105C may include one or more CPUs 130C. The CPUs 130A, 130B, and 130C are collectively referred to herein as the CPUs 130. The CPUs 130 may be configured to execute instructions. The instructions may be carried out by a special purpose computer, logic circuits, or hardware circuits of the first node 105A, the second node 105B, and the third node 105C. The CPUs 130 may be implemented in hardware, firmware, software, or any combination thereof. The term "execution" is, for example, the process of running an application or the carrying out of the operation called for by an instruction. The instructions may be written using one or more programming language, scripting language, assembly language, etc. The CPUs 130, thus, execute an instruction, meaning that they perform the operations called for by that instruction.

The first node 105A may include one or more random access memory units ("RAM") 135A, the second node 105B may include one or more RAM 135B, and the third node 105C may include one or more RAM 135C. The RAMs 135A, 135B, and 135C are collectively referred to herein as the RAMs 135. The CPUs 130 may be operably coupled to the respective one of the RAMs 135, the storage pool 140, as well as with other elements of the respective ones of the nodes 105 to receive, send, and process information, and to control the operations of the respective underlying node. Each of the CPUs 130 may retrieve a set of instructions from the storage pool 140, such as, from a permanent memory device like a read only memory ("ROM") device and copy the instructions in an executable form to a temporary memory device that is generally some form of random access memory ("RAM"), such as a respective one of the RAMs 135. One of or both of the ROM and RAM be part of the storage pool 140, or in some embodiments, may be separately provisioned from the storage pool. The RAM may be stand-alone hardware such as RAM chips or modules. Further, each of the CPUs 130 may include a single stand-alone CPU, or a plurality of CPUs that use the same or different processing technology.

Each of the DAS 145 may include a variety of types of memory devices. For example, in some embodiments, one or more of the DAS 145 may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the NAS 150 may include any of a variety of network accessible storage (e.g., the cloud storage 155, the LAN storage 160, etc.) that is suitable for use within the virtual computing system 100 and accessible via the network 165. The storage pool 140, including the NAS 150 and the DAS 145, together form a distributed storage system configured to be accessed by each of the nodes 105 via the network 165, one or more of the OVMs 110, one or more of the CVMs 115, and/or one or more of the hypervisors 125.

Each of the nodes 105 may be configured to communicate and share resources with each other via the network 165, including the respective one of the CPUs 130, the respective one of the RAMs 135, and the respective one of the DAS 145. For example, in some embodiments, the nodes 105 may communicate and share resources with each other via one or more of the OVMs 110, one or more of the CVMs 115, and/or one or more of the hypervisors 125. One or more of the nodes 105 may be organized in a variety of network topologies.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Although three of the plurality of nodes (e.g., the first node 105A, the second node 105B, and the third node 105C) are shown in the virtual computing system 100, in other embodiments, greater than or fewer than three nodes may be used. Likewise, although only two of the OVMs are shown on each of the first node 105A (e.g. the OVMs 111), the second node 105B, and the third node 105C, in other embodiments, greater than or fewer than two OVMs may reside on some or all of the nodes 105.

It is to be understood again that only certain components and features of the virtual computing system 100 are shown and described herein. Nevertheless, other components and features that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Querying Objects on Demand

Figure 2:
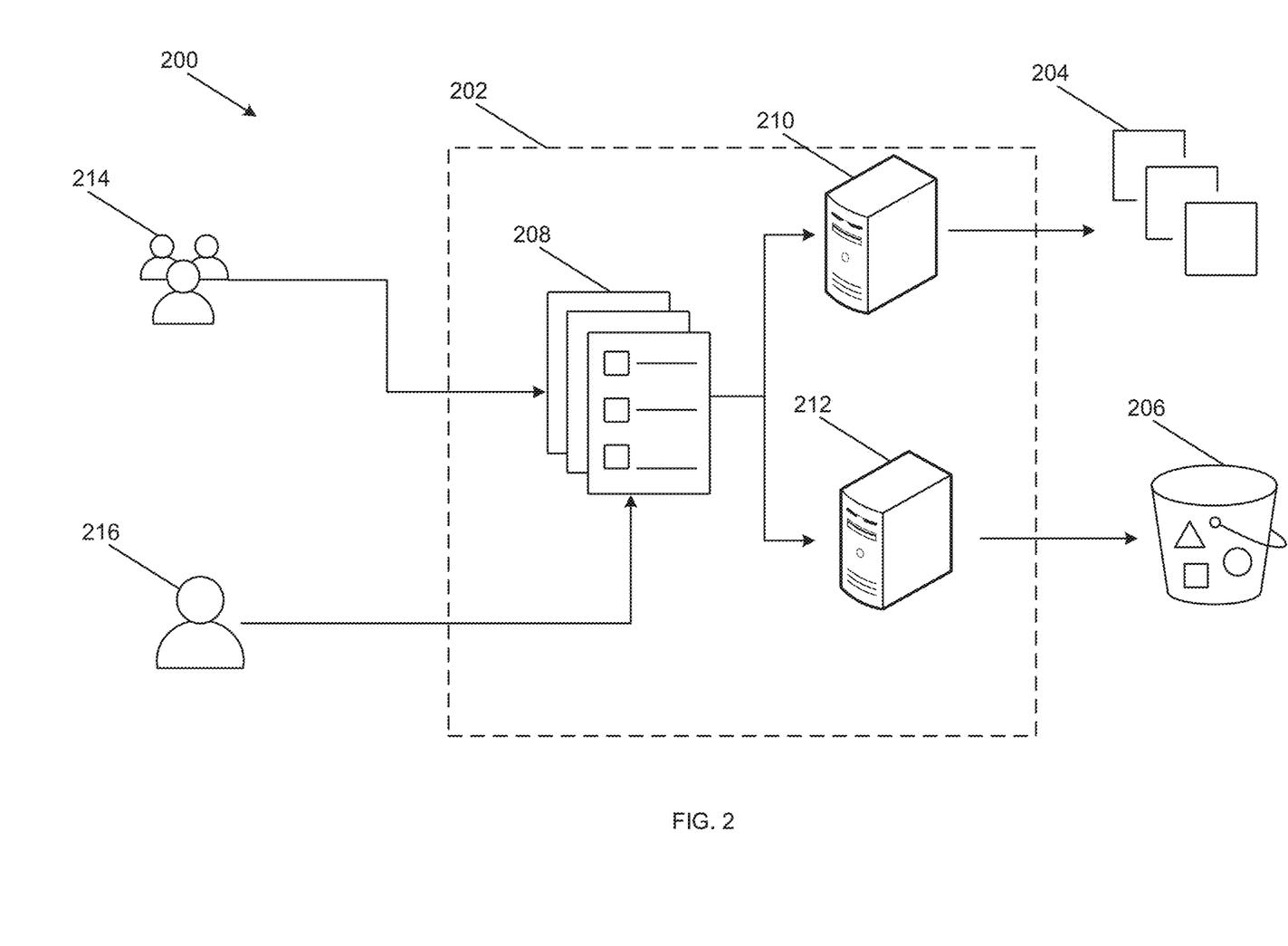
FIG. 2 illustrates an example diagram of an object storage service (OSS), in accordance with some embodiments of the present disclosure.

FIG. 2 illustrates an example diagram of an object storage service (OSS) 200, in accordance with some embodiments. The OSS 200 includes a compute layer 202, a metadata server 204, and a bucket 206. The compute layer 202 includes a user interface (UI) service 208, a metadata service 210 in communication with the metadata server 204, and an object controller (OC) service 212 in communication with the bucket 206. Users 214 and IT administrator 216 are in communication with the UI service 208.

The UI service 208 includes a processing having programmed instructions (herein, the UI service 208 includes programmed instructions) to receive a query, such as an SQL (structured query language) query, from the users 214 or the IT administrator 216. In some embodiments, the SQL query is received as an application programming interface (API) call, such as an HTTP-based web API call. In some embodiments, the SQL query is HTTP 1.1 compliant. In some embodiments, the SQL query includes one or more parameters (e.g., query target, bucket name, bucket endpoint, prefix, object attribute relationships, metadata relationships, metadata parameters, a prefix, etc.) specified/indicated by the users 214 or the IT administrator 216.

In some embodiments, the UI service 208 includes programmed instructions to determine (e.g., identify) the query target to be a metadata server 204 or a bucket 206. In some embodiments, if the UI service 208 determines that the query target is a metadata server 204, the UI service 208 includes programmed instructions to direct the SQL query to the metadata service 210, where the query is executed on metadata in the metadata server 204. In some embodiments, if the UI service 208 determines that the query target is a bucket 206, the UI service 208 includes programmed instructions to direct the SQL query to the OC service 212, where the query is executed on the bucket 206. In some embodiments, directing the SQL query includes forwarding the API call. In some embodiments, directing the SQL query includes parsing the API call to identify one or more parameters and sending the one or more parameters. In some embodiments, sending the one or more parameters includes encapsulating the one or more parameters in a message, a frame, a packet, a function, another API call, another SQL query, etc. In some embodiments, the UI service 208 has programmed instructions to execute (e.g., run, evaluate) the SQL query.

The OC service 212 includes a processing having programmed instructions (herein, the OC service 212 includes programmed instructions) to execute a SQL query on/against one or more objects in the bucket 206. In some embodiments, the OC service 212 includes programmed instructions to scan the one or more objects in the bucket 206 and generate a list of objects from the one or more objects in the bucket 206.

An example SQL query executed by the OC service 212 is shown below:

---

POST /?select&select-type=2/ HTTP/1.1
Host: examplebucket.nutanix.com
Date: Tue, 17 Oct 2017 01:49:52 GMT
Authorization: authorization string
Content-Length: content length
<?xml version="1.0" encoding="UTF-8"?>
<SelectRequest>
    <Expression>Select * from S3Bucket object_inventory
</Expression>
    <ExpressionType>SQL</ExpressionType>

---

In the example, the word "S3Bucket" indicates that the query target is a bucket (as opposed to a metadata server). The bucket name is "object_inventory." The endpoint (e.g., name, identifier, URL) of the bucket 206 in the example is "examplebucket.nutanix.com." When executing, the OC service 212 executes the query on objects from the bucket 206 having the endpoint "examplebucket.nutanix.com," and the name "object_inventory," as shown based on the command "select from S3Bucket object_inventory." In some embodiments, the OC service 212 generates a list of objects from the bucket "object_inventory."

The OC service 212 can receive the SQL query from the UI service 208. In some embodiments, the OC service 212 includes programmed instructions to determine the query target to be a bucket. In some embodiments, the OC service 212 includes programmed instructions to execute SQL query on/against one or more objects in the bucket 206 responsive to either receiving the SQL query from the UI service 208 or determining the query target to be a bucket.

In some embodiments, the OC service 212 includes programmed instructions to identify a predicate/condition) (e.g., a prefix, an object attribute relationship, a metadata relationship) specified in the SQL query. Based on identifying a prefix specified in the SQL query, in some embodiments, the OC service 212 includes programmed instructions to determine which of the one or more objects in the bucket 206 have a prefix matching the prefix in the SQL query. In some embodiments, the list of objects include the objects identified by the OC service 212 as having the matching prefix.

An example of an SQL query (modifying the above example) to specify a prefix is shown below:
POST/?select&select-type=2?prefix=megastore/HTTP/1.1

In the example, The OC service 212 selects (e.g., filters, prunes, identifies, narrows down the scope of the query to only run on) objects having a prefix matching the prefix "megastore," as shown based on the prefix "prefix=megastore." In some embodiments, the OC service 212 generates a list of the selected objects.

In some embodiments, the OC service 212 includes programmed instructions to identify object-related/object-oriented attribute relationships (e.g., object attribute relationships) specified in the SQL query. Based on identifying the object attribute relationships in the SQL query, in some embodiments, the OC service 212 includes programmed instructions to determine which of the one or more objects in the bucket 206 have one or more object attributes satisfying (e.g., all of) the object attribute relationships in the SQL query. In some embodiments, the OC service 212 includes programmed instructions to scan the objects of the one or more objects in the bucket 206. In some embodiments, the OC service 212 includes programmed instructions to generate a list of objects the list of objects including the one or more objects identified by the OC service 212 as having the one or more object attributes satisfying the object attribute relationships in the SQL query. The object attribute relationship may be a relationship (e.g., greater than, less than, equal to, or a combination thereof) between an object attribute (e.g., parameter) and a number (e.g., predetermined threshold, dynamic threshold, function, etc.), a relationship between two object attributes, two or more such relationships (e.g., a range), etc. The object attributes can be object related (e.g., object-oriented). For example, the object can be an "order_inventory" and the object attributes can include "item_type" and "price."

An example of an SQL query to specify an object attribute is shown below:

<Expression>Select * from S3Bucket 'order_inventory' where 'item_type' = 'book' and 'genre' = 'sci_fi'; </Expression>

In the example, The OC service 212 selects objects having "'item_type'='book' and 'genre'='sci_fi'." In some embodiments, the OC service 212 generates a list of the selected objects.

The metadata service 210 includes a processing having programmed instructions (herein, the metadata service 210 includes programmed instructions) to execute/run a SQL query on/against metadata of the one or more objects in the bucket 206. In some embodiments, the metadata service 210 includes programmed instructions to determine one or more metadata relationships specified in the SQL query. In some embodiments, the metadata service 210 includes programmed instructions to scan the metadata of the one or more objects in the bucket 206 and generating a list of objects from the one or more objects satisfying the one or more metadata relationships. The metadata relationship may be a relationship between a metadata parameter and a number (e.g., predetermined threshold, dynamic threshold, function, etc.), a relationship between two metadata parameters, two or more such relationships (e.g., a range), etc. Metadata parameters can include last time an object was written to (e.g., updated), last time an object was read, a type (e.g., filetype) of the object, a size of the object, etc.

An example SQL query executed by the metadata service 210 is shown below:

<Expression>Select * from S3Meta where modified > 'current_time( )– 300' and fileType = 'csv' and size >= '2048'; </Expression>

In the example, the word "S3Meta" indicates that the query target is a metadata server. As in the previous example, the endpoint of the bucket 206 in the example is "examplebucket.nutanix.com." When executing, the metadata service 210 executes the query on metadata of objects from the bucket 206 having the endpoint "examplebucket.nutanix.com," as shown based on the command "Select*from S3Meta." Additionally, or alternatively, the metadata service 210 identifies a bucket name specified in the SQL query and executes the query from the bucket 206 having the bucket name. The metadata service 210 selects objects having metadata satisfying the following relationships: "modified>'current_time( )–300' and fileType='csv' and size>='2048'." In this example, the metadata service 210 returns the list of objects in the bucket 206 that have been added in the last 5 minutes, have a file type csv, and are greater than or equal to 2048 bytes.

Figure 3:
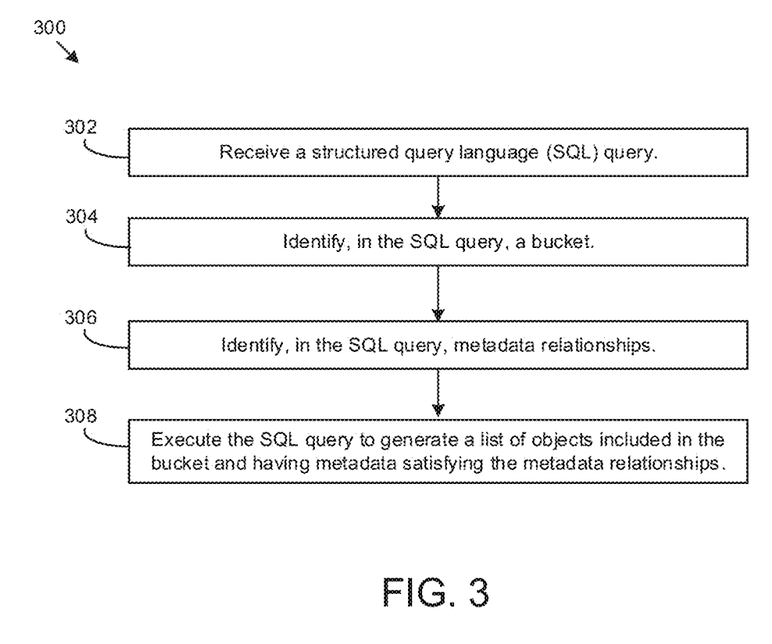
FIG. 3 illustrates an example method for executing SQL queries, in accordance with some embodiments of the present disclosure.

Referring now to FIG. 3, an example method 300 for executing SQL queries is shown, in accordance with some embodiments of the present disclosure. The method 300 may be implemented using, or performed by, the OSS 200, one or more components of the OSS 200, or a processor associated with the OSS 200 or one or more components of the OSS 200, which is detailed herein with respect to FIGS. 1-2. Additional, fewer, or different operations may be performed in the method 300 depending on the embodiment. Operations of method 300 can be combined with operations of methods 400-500.

A processor, such as the processor (e.g., the CPU 130A) associated with one or more components of the OSS 200, receives a structured query language (SQL) query (302). The processor receives the SQL query from a user (e.g., one of the Users 214) or an admin (e.g., the IT administrator 216). In some embodiments, in the SQL query, the user or admin specifies at least one of a bucket name, a bucket endpoint, a query target, or metadata relationships. The processor identifies, in the SQL query, a bucket (304). In some embodiments, the bucket is identified based on at least one of the bucket name or the bucket endpoint. In some embodiments, the bucket includes one or more objects. In some embodiments, the processor determines, in the SQL query, a query target to be a metadata server (e.g., the metadata server 204) associated with the bucket (e.g., the one or more objects in the bucket). In some embodiments, the processor determines the query target to be a bucket (e.g., the bucket 206).

The processor identifies, in the SQL query, metadata relationships (306). In some embodiments, the metadata relationships include one or more relationships between a metadata parameter and a number/threshold/limit. In some embodiments, the metadata relationships include one or more relationships between a metadata parameter, a lower number, and a higher number (e.g., a range). The processor executes (e.g. runs, evaluates, processes) the SQL query to generate a list of objects included in (e.g., belonging to, assigned to, etc.) the bucket and having metadata satisfying the metadata relationships (308).

In some embodiments, the processor identifies object attribute relationships. In some embodiment, the processor executes the SQL query to generate a list of objects belonging to the bucket and having object attributes satisfying the object attribute relationships.

Referring back to FIG. 2, in some embodiments, one of the components of the compute layer 202 (e.g., the metadata service 210 or the OC service 212) have programmed instructions to create a temporary bucket (e.g., notational bucket, virtual index). In some embodiments, the temporary bucket has a reduced number of the one or more objects (e.g., a reduced dataset) as compared to the bucket 206. The temporary bucket includes symbolic links (symlinks) to the objects (e.g., the reduced number of objects) in the bucket 206. In some embodiments, the temporary bucket does not copy the objects from the bucket 206, such that the virtual disk backing the bucket 206 has no knowledge of the temporary bucket. The temporary bucket can either be stored in shared memory or as a special object within the bucket 206. In some embodiments, one of the components of the compute layer 202 has programmed instructions to store the predicate that was used to filter the objects that are contained in the temporary bucket The predicate can be stored in the metadata server 204 as metadata of the temporary bucket.

An example of creating an object attribute-based temporary bucket is shown below:

```
create data_index 'sci-fi_index' using select object from S3Bucket
'order_inventory' where 'item_type' = 'book' and 'genre' = 'sci_fi'
```

In the example, a temporary bucket "sci-fi_index" is created based on an SQL query executed by the OC Service 212 on objects satisfying the relationship "'item_type'='book' and 'genre'='sci_fi'."

An example of creating a metadata-based temporary bucket is shown below:

```
create index 'orders_last_24hrs' using select object from S3Meta
where bucket='order_history' and modified > current_time( ) − 86400
and fileType = "csv"
```

In the example, a temporary bucket "order_last_24 hrs" is created based on an SQL query executed by the metadata service 210 on objects satisfying the relationship "bucket='order_history' and modified>current_time( )−86400 and fileType="csv"." In some embodiments, a keyword identify (e.g., "index") is used to identify the creation of a temporary bucket.

In some embodiments, the OC service 212 includes programmed instructions to execute a SQL query against the temporary bucket. Whenever an object (e.g., entry) in the list of the temporary bucket is requested, the request is redirected to the object that is stored in the bucket 206.

An example of executing an SQL query on a temporary bucket is shown below:

```
select city, sum(order_total) as city_total from
'orders_last_24_hrs' group by city order by city_total desc limit 10;
```

In the example, the SQL query is run against the metadata-based temporary bucket "order_last_24 hrs." In some embodiments, the OC service 212 includes programmed instructions to generate a list of objects from the temporary bucket. In some embodiments, the OC service 212 includes programmed instructions to filter (e.g., by including further conditions), sort, or filter and sort, the objects in the temporary bucket and generate a list of objects from the filtered/sorted objects. In some embodiments, one of the components of the compute layer 202 deletes the temporary bucket. In some embodiments, one of the components of the compute layer 202 deletes the temporary bucket by executing (e.g., issuing) a "drop table" SQL query. In some embodiments, the SQL query is run against an object attribute-based temporary bucket Referring now to FIG. 4, an example method 400 for executing SQL queries is shown, in accordance with some embodiments of the present disclosure. The method 400 may be implemented using, or performed by, the OSS 200, one or more components of the OSS 200, or a processor associated with the OSS 200 or one or more components of the OSS 200, which is detailed herein with respect to FIGS. 1-2. Additional, fewer, or different operations may be performed in the method 400 depending on the embodiment. Operations of method 400 can be combined with operations of methods 300 and 500.

Figure 4:
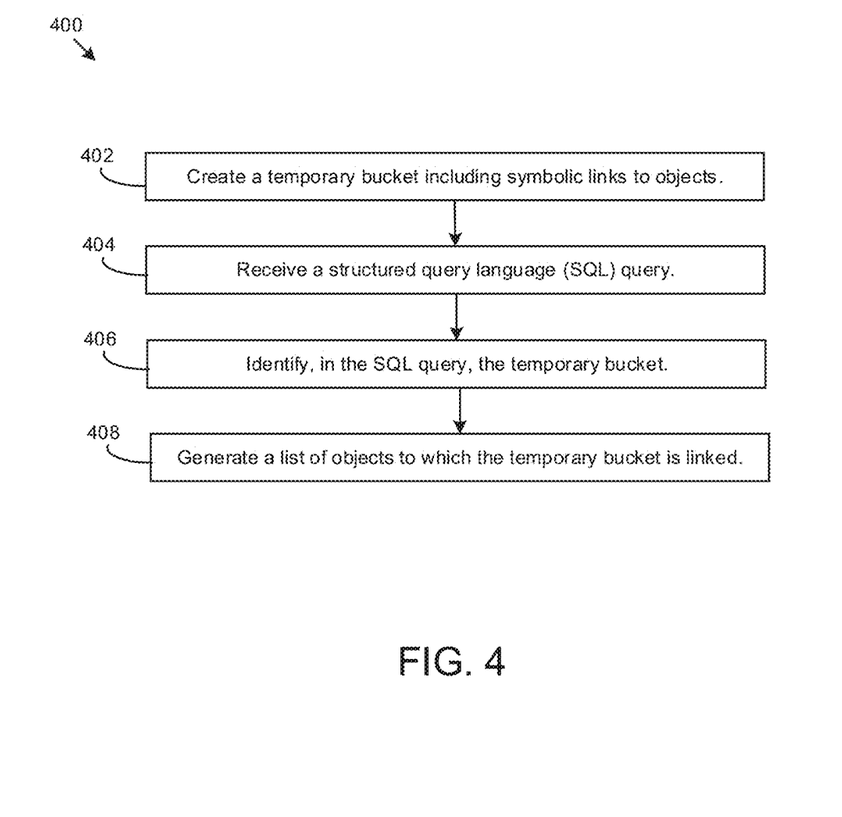
FIG. 4 illustrates an example method for executing SQL queries, in accordance with some embodiments of the present disclosure.

A processor, such as the processor (e.g., the CPU 130A) associated with one or more components of the OSS 200, creates a temporary bucket (402). The temporary bucket includes symbolic links to objects belonging to a bucket (e.g., the bucket of method 300). In some embodiments, the processor creates the temporary bucket by executing an SQL query (e.g., a first SQL query, an SQL query similar to the SQL query of method 300, a command, a request, a call). In some embodiments, the linked objects have metadata satisfying a predicate (e.g., the metadata relationships of method 300) specified in the (first) SQL query. In some embodiments, the predicate includes a metadata relationship for when the object was created. In some embodiments, the linked objects are static (e.g., the object attributes thereof are not changing above a predetermined frequency threshold). In some embodiments, the linked objects have object attributes satisfying a predicate (e.g., object attribute relationships) specified in the (first) SQL query.

The processor receives an SQL query (e.g., a second SQL query) (404). The processor identifies, in the (second) SQL query, the temporary bucket (406). The processor generates a list of objects to which the temporary bucket is linked (408). In some embodiments, the temporary bucket in method 400 is used for OLAP (online analytical processing) workloads, where the second query is run against a historical dataset in order to, in some embodiments, generate reports for recent time periods (e.g., last 24 hours, last 7 days).

Referring back to FIG. 2, in some embodiments, one of the components of the compute layer 202 has programmed instructions to update a temporary bucket as objects are uploaded to the bucket 206, updated (e.g., object attributes or metadata are updated), or deleted from the bucket 206. In some embodiments, one of the components of the compute layer 202 has programmed instructions to create an event handler. In some embodiments, the event handler gets invoked whenever an object is either uploaded from the bucket 206, updated, or deleted (e.g., removed) from the bucket 206. For example, when an object is updated or a new object is uploaded, and the object is in the bucket 206 that contains objects to which a temporary bucket is linked (e.g., has symlinks), the event handler evaluates (e.g., re-evaluates) the object against the predicate used in creating the temporary bucket. In some embodiments, the object attributes or the metadata of the object is compared to a predicate (e.g., metadata relationships or object attribute relationships) of the temporary bucket. If the object matches (e.g., has metadata/object attributes that match/satisfies) the predicate, then one of the components of the compute layer 202 has programmed instructions to add the object (e.g., a symlink thereof) to the temporary bucket if it is not in the temporary bucket, or retain the object (e.g., a symlink thereof) if it is in the temporary bucket. If the object does not match the predicate, then one of the components of the compute layer 202 has programmed instructions to not add the object (e.g., a symlink thereof) to the temporary bucket if it is not in the temporary bucket, or remove the object (e.g., a symlink thereof) from the temporary bucket if it is in the temporary bucket. In some embodiments, when an object is deleted from the bucket 206, and one of the components of the compute layer 202 determines that the object is in the temporary bucket, one of the components of the compute layer 202 has programmed instructions to delete the object from the temporary bucket. In some embodiments, removing the object can be deleted at the time that the object needs to be fetched (e.g., during query evaluation). In some embodiments, the temporary buckets are used for OLTP (Online transaction processing) workloads.

In some embodiments, the OC Service 212 has programmed instructions to select a temporary bucket from multiple temporary buckets against which the one of the OC Service 212 would run a query that is presented to the OC Service 212. In some embodiments, the OC Service 212 has programmed instructions to lookup the list of temporary buckets in the system and try and run the query against the most relevant temporary bucket. In some embodiments, the OC Service 212 has programmed instructions to determine the most relevant temporary bucket by matching the most relevant temporary bucket (e.g., the name thereof) to the temporary bucket (e.g., the name thereof) specified in the query.

Figure 5:
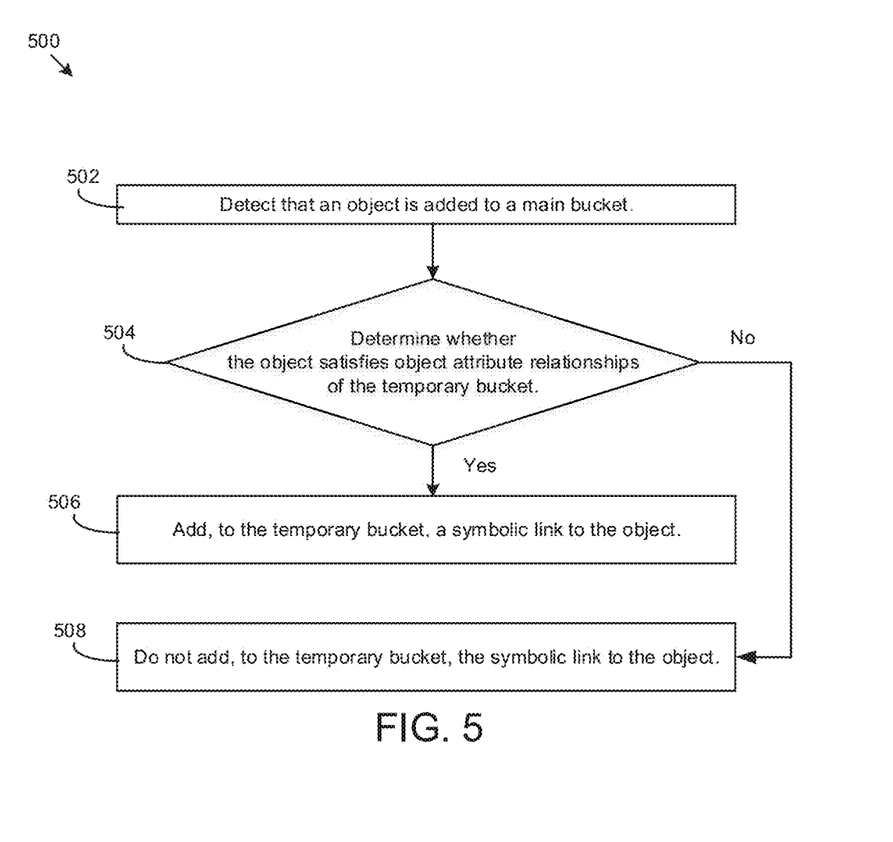
FIG. 5 illustrates an example method for updating temporary buckets, in accordance with some embodiments of the present disclosure.

Referring now to FIG. 5, an example method 500 for updating temporary buckets is shown, in accordance with some embodiments of the present disclosure. The method 500 may be implemented using, or performed by, the OSS 200, one or more components of the OSS 200, or a processor associated with the OSS 200 or one or more components of the OSS 200, which is detailed herein with respect to FIGS. 1-2. Additional, fewer, or different operations may be performed in the method 500 depending on the embodiment. Operations of method 500 can be combined with operations of methods 300-400.

A processor, such as the processor (e.g., the CPU 130A) associated with one or more components of the OSS 200, detects that an object is added to (e.g., uploaded to, updated on) a main bucket (e.g., the bucket 206) including one or more objects the temporary bucket is linked to (502). In some embodiments, the processor invokes (e.g., executes) an event handler (e.g., instructions, method, function, routine) in response to the object being added to the main bucket. The processor (e.g., via the event handler) determines whether the object (e.g., object attributes of the object) or metadata of the object satisfies a predicate (e.g., object attribute relationships or metadata relationships specified/used in creating the temporary bucket) of the temporary bucket (504). If the processor determines that the object or metadata satisfies the predicate, the processor adds, to the temporary bucket, the object (e.g., a symbolic link to the object) (506). If the processor determines that the object or metadata does not satisfy the predicate, the processor does not add, to the temporary bucket, the object (e.g., a symbolic link to the object) (508).

In some embodiments, the processor detects that an object (e.g., the object attributes or metadata thereof) in the main bucket is being updated. In some embodiments, the processor invoked the event handler in response to the object being updated. In some embodiments, if the processor determines that the object attribute/metadata satisfies the predicate, and the temporary bucket has a symlink to the object, the symlink is retained. In some embodiments, if the processor determines that the object attribute/metadata satisfies the predicate, and the temporary bucket does not have a symlink to the object, the symlink is added. In some embodiments, if the processor determines that the object attribute/metadata does not satisfy the predicate, and the temporary bucket has a symlink to the object, the symlink is removed. In some embodiments, the symlink is marked for removal and is removed at the next execution of an SQL query using the temporary bucket. In some embodiments, if the processor determines that the object attribute/metadata does not satisfy the predicate, and the temporary bucket does not have a symlink to the object, the symlink is not added.

Each of the elements/entities/components of the virtual computing system 100 and the OSS 200 (e.g., the metadata server 204, the bucket 206, the UI service 208, the metadata service 210, and the OC service 212), is implemented using hardware, software, or a combination of hardware or software, in one or more embodiments. For instance, some of the elements or entities of the virtual computing system 100 and the OSS 200 may be implemented as an apparatus comprising custom VLSI circuits or gate arrays, off-the-shelf semiconductors such as logic chips, transistors, or other discrete components. Some of the elements or entities of the virtual computing system 100 and the OSS 200 may be implemented as an apparatus comprising programmable hardware devices such as field programmable gate arrays, programmable array logic, programmable logic devices, or the like. Some of the elements or entities of the virtual computing system 100 and the OSS 200 can include any application, program, library, script, task, service, process or any type and form of executable instructions executed by one or more processors (e.g. the CPU 130A), in one or more embodiments. Each of the one or more processors is hardware. The instructions may be stored on one or more computer readable and/or executable storage media including non-transitory storage media such as non-transitory storage media in the storage pool 140 with respect to FIG. 1.

In some embodiments, one or more of the components of the OSS 200 are run on (e.g., included in) at least one of one or more of the OVMs 110 or one or more CVMs 115. In some embodiments, at least of the bucket 206 or the metadata server 204 is backed by one or more vdisks 120 of FIG. 1 and/or a component of the storage pool 140. In some embodiments, the OSS 200 can include more than one of at least one of the metadata server 204, the bucket 206, the UI service 208, the metadata service 210, or the OC service 212).

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed:

1. An apparatus comprising a processor and a memory, the memory comprising programmed instructions that, when executed by the processor, cause the apparatus to:
   detect that an object is uploaded to a main bucket;
   determine whether the object has an object attribute satisfying an object attribute relationship;
   responsive to determining that the object has the object attribute that satisfies the object attribute relationship, add, to a temporary bucket, a symbolic link to the object;
   detect that the object in the main bucket is updated;
   responsive to detecting the object is updated, determine whether the object has a second object attribute satisfying the object attribute relationship; and
   responsive to determining that the object does not have the second object attribute that satisfies the object attribute relationship, delete, from the temporary bucket, the symbolic link to the object.

2. The apparatus of claim 1, wherein the memory includes programmed instructions that, when executed by the processor, further cause the apparatus to:
   detect that the object is deleted from the main bucket; and
   delete, from the temporary bucket, the symbolic link to the object.

3. The apparatus of claim 1, wherein the memory includes programmed instructions that, when executed by the processor, further cause the apparatus to:
   invoke an event handler responsive to the object being uploaded to the main bucket; and
   cause the event handler to evaluate whether the object has the object attribute satisfying the object attribute relationship.

4. The apparatus of claim 1, wherein the memory includes programmed instructions that, when executed by the processor, further cause the apparatus to:
   identify an identifier of the temporary bucket; and
   select, from a list of temporary buckets, the temporary bucket based on the identifier.

5. The apparatus of claim 1, wherein the temporary bucket is used for online transaction processing.

6. A non-transitory computer readable storage medium having instructions stored thereon that, upon execution by a processor, cause the processor to:
   detect that an object is uploaded to a main bucket;
   determine whether the object has an object attribute satisfying an object attribute relationship;
   responsive to determining that the object has the object attribute that satisfies the object attribute relationship, add, to a temporary bucket, a symbolic link to the object;
   detect that the object in the main bucket is updated;
   responsive to detecting the object is updated, determine whether the object has a second object attribute satisfying the object attribute relationship; and
   responsive to determining that the object does not have the second object attribute that satisfies the object attribute relationship, delete, from the temporary bucket, the symbolic link to the object.

7. The medium of claim 6, comprising instructions stored thereon that, when executed by the processor, further cause the processor to:
   detect that the object is deleted from the main bucket; and
   delete, from the temporary bucket, the symbolic link to the object.

8. The medium of claim 6, comprising instructions stored thereon that, when executed by the processor, further cause the processor to:
  invoke an event handler responsive to the object being uploaded to the main bucket; and
  cause the event handler to evaluate whether the object has the object attribute satisfying the object attribute relationship.

9. The medium of claim 6, comprising instructions stored thereon that, when executed by the processor, further cause the processor to:
  identify an identifier of the temporary bucket; and
  select, from a list of temporary buckets, the temporary bucket based on the identifier.

10. The medium of claim 6, wherein the temporary bucket is used for online transaction processing.

11. A computer-implemented method comprising:
  detecting, by the processor, that an object is uploaded to the main bucket;
  determining, by the processor, whether the object has an object attribute satisfying an object attribute relationship;
  responsive to determining that the object has the object attribute that satisfies the object attribute relationship, adding, by the processor and to a temporary bucket, a symbolic link to the object;
  detecting that the object in the main bucket is updated;
  responsive to detecting the object is updated, determining whether the object has a second object attribute satisfying the object attribute relationship; and
  responsive to determining that the object does not have the second object attribute that satisfies the object attribute relationship, deleting, from the temporary bucket, the symbolic link to the object.

12. The method of claim 11, the further comprising:
  detecting that the object is deleted from the main bucket; and
  deleting, from the temporary bucket, a link to the object.

13. The method of claim 11, the further comprising:
  invoking an event handler responsive to the object being uploaded to the main bucket; and
  causing the event handler to evaluate whether the object has the object attribute satisfying the object attribute relationship.

14. The method of claim 11, the further comprising:
  identifying an identifier of the temporary bucket; and
  selecting, from a list of temporary buckets, the temporary bucket based on the identifier.

* * * * *